(12) United States Patent
Kropp

(10) Patent No.: US 10,308,102 B2
(45) Date of Patent: Jun. 4, 2019

(54) DAMPED TORQUE ROLL RESTRICTOR

(71) Applicant: VIBRACOUSTIC USA, INC., South Haven, MI (US)

(72) Inventor: Andrew J. Kropp, Stevensville, MI (US)

(73) Assignee: VIBRACOUSTIC USA, INC., South Haven, MI (US)

( * ) Notice: Subject to any disclaimer, the term of this patent is extended or adjusted under 35 U.S.C. 154(b) by 0 days.

(21) Appl. No.: 15/887,110

(22) Filed: Feb. 2, 2018

(65) Prior Publication Data

US 2018/0222305 A1 Aug. 9, 2018

Related U.S. Application Data

(60) Provisional application No. 62/455,795, filed on Feb. 7, 2017.

(51) Int. Cl.
*B60K 5/12* (2006.01)
*F16H 57/025* (2012.01)
(Continued)

(52) U.S. Cl.
CPC .......... *B60K 5/1216* (2013.01); *B60K 5/1241* (2013.01); *F16F 1/3849* (2013.01);
(Continued)

(58) Field of Classification Search
CPC ...... B60K 5/12; B60K 5/1208; B60K 5/1216; B60K 5/1225; B60K 5/1233; B60K 5/1241; B60K 5/1266
See application file for complete search history.

(56) References Cited

U.S. PATENT DOCUMENTS

| 4,518,058 A | * | 5/1985 | Fister | B60K 5/125 |
| | | | | 180/297 |
| 5,035,397 A | * | 7/1991 | Yamada | B60K 5/1208 |
| | | | | 180/297 |

(Continued)

FOREIGN PATENT DOCUMENTS

| DE | 4316213 A1 | 11/1994 |
| DE | 102013213078 A1 | 1/2015 |

(Continued)

OTHER PUBLICATIONS

European Search Report EP155494, dated Jun. 22, 2018.

*Primary Examiner* — Erez Gurari
(74) *Attorney, Agent, or Firm* — Fishman Stewart PLLC

(57) ABSTRACT

A torque roll restrictor assembly for a vehicle includes a first member configured for connection with a body of a vehicle, a second member rotatably connected to the first member and configured for connection with a powertrain of said vehicle, and a damper connected to the first member. A first member may include a first portion, a second portion to which the second member may be rotatably connected, and a third portion connecting the first portion and the second portion. A first portion of the first member may include an outer wall, an inner wall defining a channel, at least one bushing disposed between the inner wall and the outer wall, and a connector configured to connect the first member to said body of said vehicle. A connector may be at least partially disposed within the channel.

16 Claims, 4 Drawing Sheets

(51) Int. Cl.
  *F16F 7/12*   (2006.01)
  *F16F 1/38*   (2006.01)
  *F16F 1/393*  (2006.01)
  *F16F 7/09*   (2006.01)

(52) U.S. Cl.
  CPC ............... F16F 1/393 (2013.01); F16F 7/09 (2013.01); F16F 7/12 (2013.01); F16H 57/025 (2013.01)

(56) References Cited

U.S. PATENT DOCUMENTS

| | | | | |
|---|---|---|---|---|
| 6,340,080 | B1* | 1/2002 | Carlson | A63B 21/0056 188/267 |
| 6,354,614 | B1* | 3/2002 | Ham, Jr. | B60K 5/1241 267/293 |
| 2005/0254888 | A1* | 11/2005 | Oji | F16F 1/3849 403/187 |
| 2007/0018367 | A1* | 1/2007 | Kamei | F16F 1/3863 267/140.12 |
| 2007/0272051 | A1* | 11/2007 | Kamei | B60G 7/001 74/579 R |
| 2009/0166506 | A1* | 7/2009 | Ahmed | B60K 5/1208 248/634 |
| 2010/0059912 | A1* | 3/2010 | Takakura | B60K 5/1208 267/140.12 |
| 2011/0155887 | A1* | 6/2011 | Ueki | B60K 5/1208 248/636 |
| 2012/0056395 | A1* | 3/2012 | Kim | B60K 5/1241 280/124.104 |
| 2012/0091639 | A1* | 4/2012 | Lee | B60K 5/1216 267/140.11 |
| 2013/0269651 | A1* | 10/2013 | Higashi | F16F 15/08 123/198 R |
| 2013/0313399 | A1* | 11/2013 | Tsutsumi | F16F 13/10 248/638 |
| 2013/0320181 | A1* | 12/2013 | Kamei | B60K 5/1241 248/548 |
| 2013/0328254 | A1* | 12/2013 | Kojima | B60K 5/1241 267/140.15 |
| 2014/0015177 | A1* | 1/2014 | Yoneyama | B29C 45/14344 267/141.1 |
| 2014/0124645 | A1* | 5/2014 | Satou | F16F 1/3849 248/638 |
| 2015/0008305 | A1* | 1/2015 | Loeffelsender | B60K 5/1241 248/638 |
| 2015/0204406 | A1* | 7/2015 | Yoon | F16F 6/005 248/562 |
| 2015/0219178 | A1* | 8/2015 | Okumura | B60K 5/1208 267/140.13 |
| 2015/0219182 | A1* | 8/2015 | Shimada | B60K 5/1208 267/140.5 |
| 2016/0193907 | A1* | 7/2016 | Satou | F16F 1/3849 267/140.4 |
| 2017/0028834 | A1* | 2/2017 | Patel | B60K 5/1241 |
| 2017/0292582 | A1* | 10/2017 | Park | B60K 5/1283 |
| 2018/0009306 | A1* | 1/2018 | Nakamaru | F16F 13/10 |
| 2018/0030581 | A1* | 2/2018 | Michiyama | B22D 17/00 |
| 2018/0134136 | A1* | 5/2018 | Ikawa | B60K 5/1208 |
| 2018/0134137 | A1* | 5/2018 | Ikawa | B60K 5/1208 |
| 2018/0222305 | A1* | 8/2018 | Kropp | B60K 5/1216 |

FOREIGN PATENT DOCUMENTS

| | | |
|---|---|---|
| EP | 0481144 A1 | 4/1992 |
| FR | 70249 E | 3/1959 |
| WO | 2012/002535 A1 | 1/2012 |

* cited by examiner

DAMPED TORQUE ROLL RESTRICTOR

CROSS-REFERENCE TO RELATED APPLICATION

This application claims the benefit of U.S. Provisional Patent Application Ser. No. 62/455,795, filed on Feb. 7, 2017, the disclosure of which is hereby incorporated herein by reference in its entirety.

TECHNICAL FIELD

The present disclosure relates to a torque roll restrictor with an integrated damper.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

In some circumstances, vehicles may incorporate torque roll restrictors to react to and manage load inputs (e.g., high load inputs), such as impact and high torque events. Vehicles may also incorporate dampers, such as shock resistors, to react to and manage impulse events (e.g., high impulse events), such as start-up shake and shift bump events. Generally, these torque roll restrictors and dampers are separate components separately attached to different parts of a vehicle. As such, the vehicle must have sufficient space to accommodate these separate components. Further, the inclusion of multiple components can increase both assembly and maintenance costs of the vehicle.

There is therefore a desire for solutions/options that minimize or eliminate one or more challenges or shortcomings of torque roll restrictors. The foregoing discussion is intended only to illustrate examples of the present field and should not be taken as a disavowal of scope.

SUMMARY

In embodiments, a torque roll restrictor assembly may include a first member configured for connection with a body of a vehicle, a second member rotatably connected to the first member and configured for connection with a powertrain of said vehicle, and a damper connected to the first member. A first member may include a first portion, a second portion to which the second member may be rotatably connected, and/or a third portion connecting the first portion and the second portion. A first portion of the first member may include an outer wall, an inner wall defining a channel, at least one bushing disposed between the inner wall and the outer wall, and/or a connector configured to connect the first member to said body of said vehicle. A connector may be at least partially disposed within the channel.

With embodiments, a connecting member may include a wall portion that may define a channel for receiving a fastener, and/or may include a spherical portion around at least a portion of the wall portion to allow for articulation of the assembly. The inner wall may include a depression in which the spherical portion may be at least partially disposed. The second portion may include a U-shaped member having two tines between which a portion of the second member may be disposed. The two tines and the portion of the second member may have corresponding holes configured to receive a pin. The third body portion may include a cylindrical wall defining a chamber. The damper may include a shaft and a friction material disposed at least partially circumferentially around the shaft. The friction material may be configured to engage with an inner surface of the cylindrical wall to provide a damping effect. The damper may include a shaft, friction material disposed at least partially around the shaft, and/or at least one axial stop adjacent the friction material in an axial direction. A damper may include a shaft and friction material that may be disposed at least partially around the shaft. The friction material and the at least one axial stop may be axially spaced from each other. The friction material may be radially spaced from the shaft.

In embodiments, the damper may be at least one of actively and semi-actively controlled. The damper may be disposed at least partially within the third portion. The second member may include an arm and a bushing. The arm may be connected to the first member via the bushing and a pin. The bushing may at least partially isolate the arm from the first member.

With embodiments, a torque roll restrictor assembly may include a first member configured for connection with a second member and with a vehicle. The first member may include a first portion including an inner wall and an outer wall, a second portion, and/or a third portion that may connect the first portion with the second portion. A torque roll restrictor assembly may include a damper that may be connected to the inner wall of the first portion and may be disposed at least partially in the third portion. The inner wall and the outer wall may be connected via one or more bushings. A torque roll restrictor assembly may include a connector connected to the inner wall. The connector may be configured to connect the first member with said vehicle. The connector may include a spherical portion may be engaged with a depression of the inner wall. The connector may be configured to move about multiple axes relative to the inner wall. The damper may include a shaft connected to the inner wall and/or disposed at least partially in the third portion. A torque roll restrictor assembly may include friction material that may be disposed at least partially between the shaft and a wall of the third portion. A torque roll restrictor assembly may include one or more axial stops connected to the shaft. Each axial stop of the one or more axial stops may be axially spaced from the friction material and the friction material may be radially spaced from the shaft.

The foregoing and other aspects, features, details, utilities, and advantages of the present disclosure will be apparent from reading the following description, and from reviewing the accompanying drawings.

DETAILED DESCRIPTION

Figure 1:
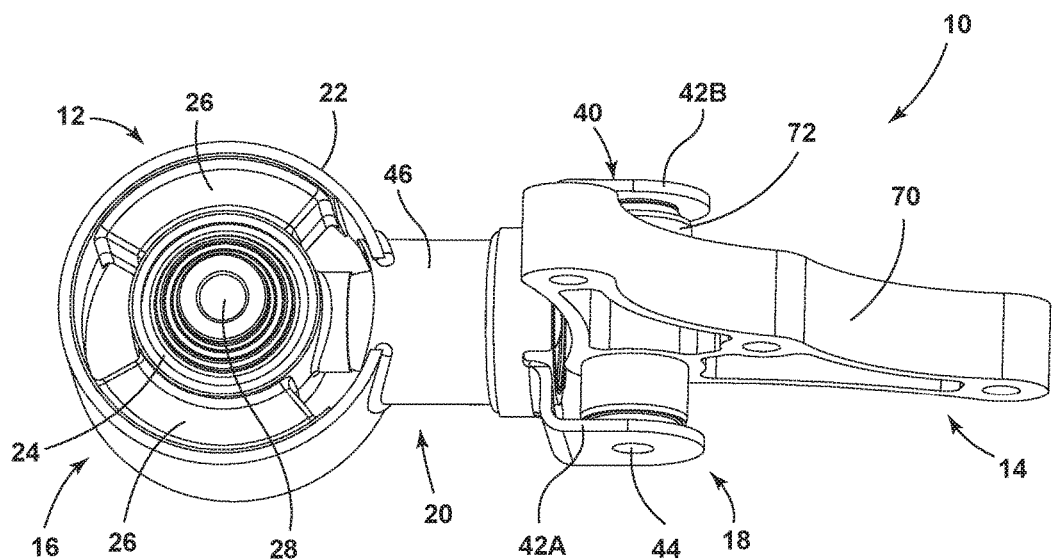
FIG. 1 is a perspective view of an embodiment of a torque roll restrictor assembly embodying aspects or teachings of the present disclosure.
Figure 2:
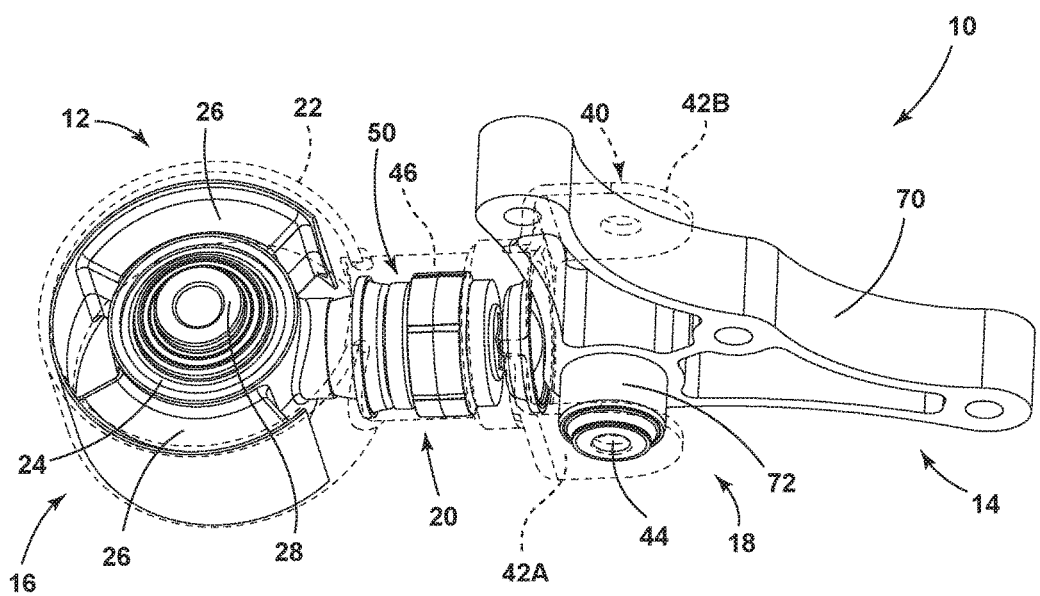
FIG. 2 is a perspective view of the torque roll restrictor assembly of FIG. 1 with portions shown as transparent.
Figure 3:
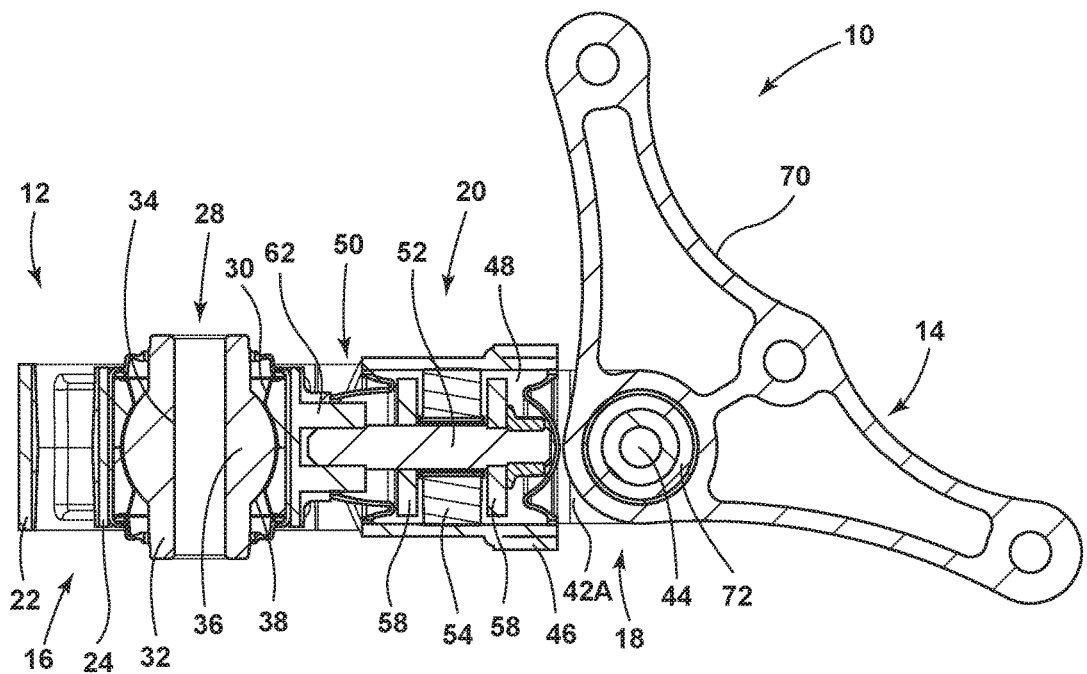
FIG. 3 is a cross-sectional view of the torque roll restrictor assembly of FIG. 1.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications, and equivalents.

In embodiments, such as generally illustrated in FIGS. 1-4, a torque roll restrictor assembly 10 for a vehicle may include a first member 12 attachable to a body portion of a vehicle, and a second member 14 attachable to a powertrain of the vehicle, such that the body and the powertrain may be indirectly connected to each other. The first member 12 and the second member 14 may be rotatably connected to each other, such as described in more detail below. The torque roll restrictor assembly 10 may also include a damper 50 that may be integrated with or within a portion of the first member 12, for example, as described in more detail herein.

With embodiments, a first member 12 may include a first portion 16, a second portion 18, and a third portion 20 that may connect the first portion 16 and the second portion 18. The first portion 16 may have an outer wall 22, an inner wall 24, and/or one or more bushings 26 disposed therebetween. The outer wall 22 and the inner wall 24 generally may comprise one or more of a variety of materials, such as a metallic material, and may or may not have the same thickness and/or axial length. The bushing(s) 26 may separate or isolate the inner wall 24 and the outer wall 22 from each other, at least to some degree, when the assembly 10 reacts to and/or manages load inputs (e.g., high load inputs), such as in connection with impact and high torque events. The bushing(s) 26 may function to provide primary isolation for the assembly 10 (e.g., to isolate a vehicle body from a powertrain). The bushings 26 may be, but are not limited to, rubber bushings and/or torque strut bushings. While the figures illustrate the outer wall 22 and inner wall 24 as being cylindrically shaped and concentric with respect to one another, it should be appreciated that other shapes and/or configurations are contemplated. In addition, while the figures illustrate two bushings 26 each disposed partially around the inner wall 24 in a circumferential direction, it should be appreciated that there may be any number of bushings 26 of the same and/or varying sizes, shapes, and materials.

In embodiments, a first portion 16 may include a connector 28 that may be disposed at least partially within a channel 30 defined by the inner wall 24. In an embodiment, a connector 28 may have a wall portion 32 defining a channel 34 configured to receive a fastener to attach the assembly 10 to the body of the vehicle. The connector 28 may also include a spherical (or semi-spherical) portion 36 that may be integrated with and/or extend from at least a portion of the wall portion 32. The inner wall 24 may include a depression 38 in which the spherical portion 36 may sit and rotate. In embodiments, the spherical portion 36 of the connector 28 and the depression 38 of the inner wall 24 may operate like a ball joint and socket and/or may allow for articulation of the assembly 10 with multiple degrees of freedom.

Figure 5:
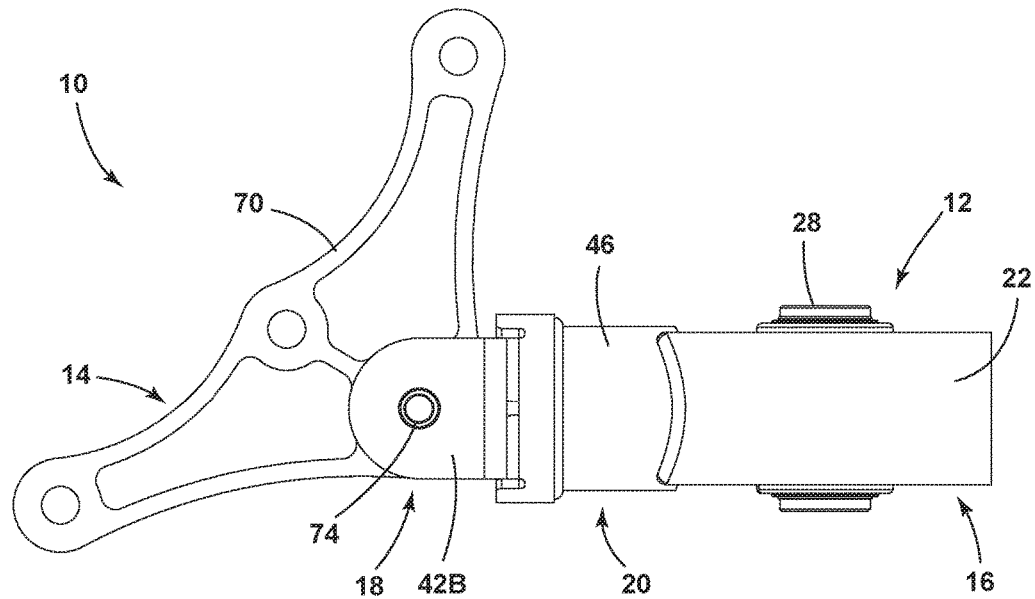
FIGS. 5 and 6 are side and top views, respectively, of the torque roll restrictor assembly of FIG. 1.
Figure 6:
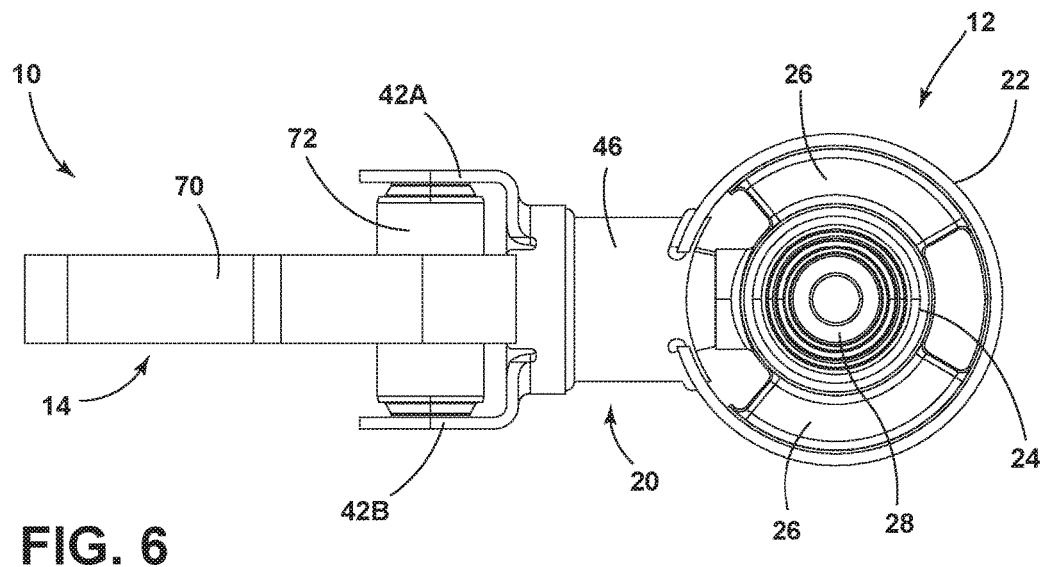
Figure 7:
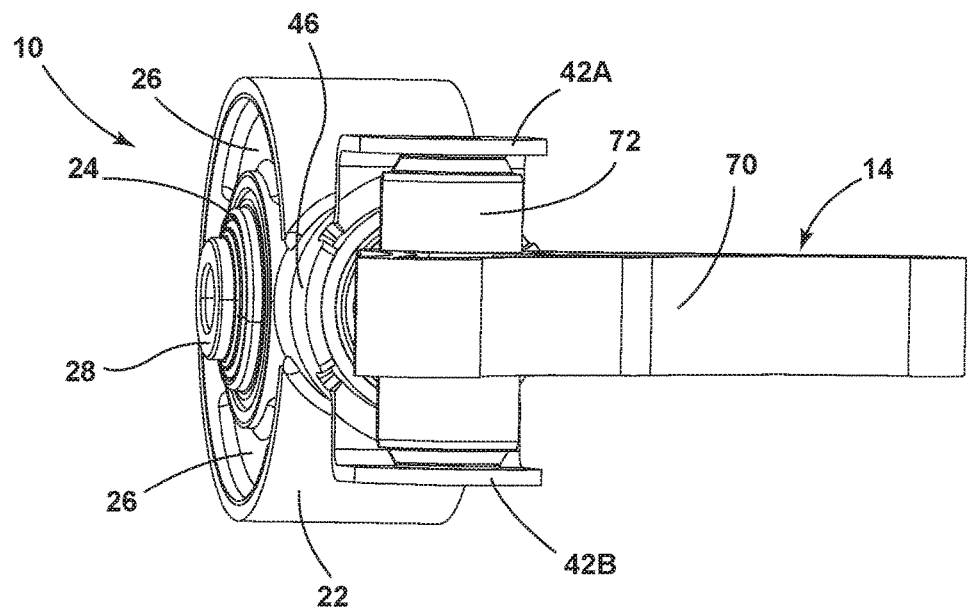
FIGS. 7 and 8 are perspective views of the torque roll restrictor assembly of FIG. 1.
Figure 8:
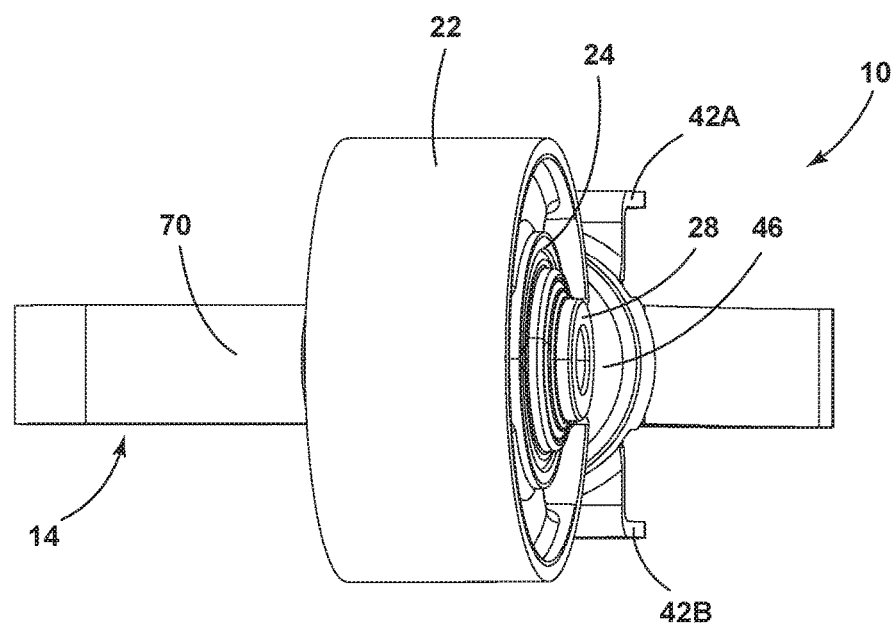

In an embodiment, the second portion 18 of the first member 12 may include a U-shaped portion or member 40 that may include two tines (e.g., tines 42A, 42B). At least a portion (e.g., an end) of the second member 14 may be disposed and/or connected between the tines 42A, 42B. The tines 42A, 42B and the end of the second member 14 may have corresponding holes and/or impressions 44 that may be aligned and may receive a connecting component (e.g., a pin 74; see, e.g., FIG. 5) around which the second member 14 may rotate or operatively move relative to the first member 12. FIGS. 6-8 generally illustrate different views of an embodiment of a torque restrictor assembly 10 such as shown in FIGS. 1 and 5. It should be appreciated that any known mechanism that may allow for such a rotatable connection between the first member 12 and the second member 14 may be utilized in lieu of or in addition to the assembly of the U-shaped member 40 and a pin 74 (e.g., a single shear joint and/or threading of the holes 44, among others).

With embodiments, a third portion 20 of a first member 12 may include a wall 46 that may define a chamber 48 in which a damper 50 may at least partially be disposed. While the figures illustrate the third portion 20 as having a generally cylindrical shape, it should be appreciated that a third portion 20 may have various shapes, including, but not limited to, rectangular, square, or ellipse-shaped cross-sections and/or changing cross-sectional areas. The wall 46 may be connected at opposite ends to the first portion 16 (e.g., to the outer wall 22) and the second portion 18 (e.g., to the base of the U-shaped member 40). The wall 46 may be connected and/or secured to the first portion 16 and the second portion 18 by any known securing or connecting methods or mechanisms, including, but not limited to, welding. Alternatively, the wall 46 may be formed as a monolithic component (e.g., a single, unitary piece) with at least one of the first portion 16 (e.g., with the outer wall 22) and the second portion 18. The third portion 20 generally may be connected such that it extends substantially perpendicular to the outer wall 22 and an axis of rotation of the second member 14 (e.g., the third portion 20 may extend in a radial direction).

Figure 4:
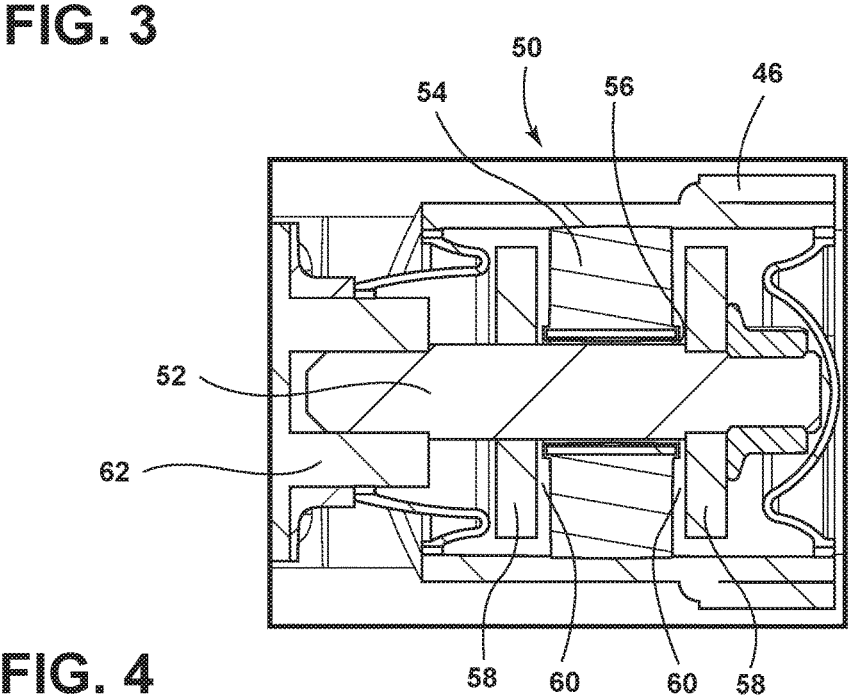
FIG. 4 is a partial, enlarged cross-sectional view of the torque roll restrictor assembly of FIG. 1.

In embodiments, as explained above, the assembly 10 may include a damper 50 that may provide damping during impulse events, such as start-up shake and shift bump events. The damping may involve friction and/or may be viscous in nature. For example and without limitation, the damper 50 may include a shaft 52 and a friction material 54 that may be disposed, at least partially, circumferentially around the shaft 52. The friction material 54 may engage with, e.g., rub against, an inner surface of the wall 46 of the third portion 20. The friction material 54 generally may have a coefficient of friction to enable damping. By way of example, the friction material 54 may comprise or include, but is not limited to, one or more of rubber, synthetic rubber, plastic, ceramic, metals, or the like. As seen in FIG. 4, the friction material 54 may be radially spaced from the shaft 52 such that there may be a gap 56 therebetween. The damper 50 may also include one or more axial stops 58 disposed on either side or both sides of the friction material 54 in an axial direction. The friction material 54 may be axially spaced from the axial stop(s) 58 such that there may be a gap 60 therebetween, such as generally illustrated in FIG. 4. A gap 60 may act as an amplitude decoupling gap to reduce or remove the damping function during small amplitude inputs, such as idle and high frequency excitations. In embodiments, the damper 50 may include a sleeve 62 in which a portion of the shaft 52 may be disposed. The sleeve 62 may be connected and/or attached to the first portion 16, e.g., to the inner wall 24, and may extend at least partially into the chamber 48 of the third portion 20. The sleeve 62 may be connected or secured to the first portion 16 by any known connecting or securing methods or mechanisms, including, but not limited to, welding. Alternatively, the sleeve 62 may be formed as a monolithic component (e.g., a single, unitary piece) with the first portion 16, e.g., with the inner wall 24.

With embodiments, a second member 14 may include an arm 70 and/or a bushing 72. The arm 70 may be connected to the first member 12 via the bushing 72 and a pin 74. The bushing 72 may provide secondary isolating for an assembly 10, such as between a vehicle body and a powertrain.

Alternatively or additionally, the damping may be controlled actively or semi-actively. For example, the damper 50 may incorporate the use of magnetorheological fluid (MR fluid) and/or valve control with solenoids. It should be appreciated that any other active or semi-active damping control is contemplated. With embodiments, the damper 50 may be configured as a viscous damper and may contain fluid (e.g., in the chamber 48), such as instead of or in addition to the friction material 54.

In some figures, portions of certain elements may not be shown and/or may be hidden to more readily illustrate other elements.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. An assembly, comprising:
   a first member configured for connection with a body of a vehicle;
   a second member rotatably connected to the first member and configured for connection with a powertrain of said vehicle; and
   a damper connected to the first member;
   wherein a first portion of the first member includes an outer wall, an inner wall defining a channel, at least one bushing disposed between the inner wall and the outer wall, and a connector configured to connect the first member to said body of said vehicle, the connector being at least partially disposed within the channel; the connector includes a wall portion defining a channel for receiving a fastener, and a spherical portion around at least a portion of the wall portion to allow for articulation of the assembly; and the inner wall includes a depression in which the spherical portion is at least partially disposed.

2. The assembly of claim 1, wherein the first member includes a first portion, a second portion to which the second member is rotatably connected, and a third portion connecting the first portion and the second portion.

3. The assembly of claim 2, wherein the second portion includes a U-shaped member having two tines between which a portion of the second member is disposed, and the two tines and the portion of the second member have corresponding holes configured to receive a pin.

4. The assembly of claim 2, wherein the third portion includes a cylindrical wall defining a chamber, and the damper includes a shaft and a friction material disposed at least partially circumferentially around the shaft, the friction material being configured to engage with an inner surface of the cylindrical wall to provide a damping effect.

5. The assembly of claim 1, wherein the damper includes a shaft, friction material disposed at least partially around the shaft, and at least one axial stop disposed adjacent the friction material in an axial direction.

6. The assembly of claim 1, wherein the damper includes a shaft and friction material disposed at least partially around the shaft; the friction material and at least one axial stop are axially spaced from each other; and, the friction material is radially spaced from the shaft.

7. The assembly of claim 1, wherein the damper is configured as a viscous damper.

8. The assembly of claim 1, wherein the damper is at least one of actively and semi-actively controlled.

9. The assembly of claim 2, wherein the damper is disposed at least partially within the third portion.

10. The assembly of claim 1, wherein the second member includes an arm and a bushing, the arm is connected to the first member via the bushing and a pin, and the bushing at least partially isolates the arm from the first member.

11. An assembly, comprising:
a first member configured for connection with a second member and with a vehicle, the first member including:
a first portion including an inner wall and an outer wall;
a second portion;
a third portion connecting the first portion with the second portion;
a damper connected to the inner wall of the first portion and disposed at least partially in the third portion; and
a connector connected to the inner wall, wherein the connector is configured to connect the first member with said vehicle, and the connector includes a spherical portion engaged with a depression of the inner wall, and the connector is configured to move about multiple axes relative to the inner wall.

12. The assembly of claim 11, wherein the inner wall and the outer wall are connected via one or more bushings.

13. The assembly of claim 11, wherein the damper includes a shaft connected to the inner wall and the shaft is disposed at least partially in the third portion.

14. The assembly of claim 13, including friction material disposed at least partially between the shaft and a wall of the third portion.

15. An assembly, comprising:
a first member configured for connection with a second member and with a vehicle, the first member including:
a first portion including an inner wall and an outer wall;
a second portion;
a third portion connecting the first portion with the second portion;
a damper connected to the inner wall of the first portion and disposed at least partially in the third portion; the damper including a shaft connected to the inner wall and the shaft is disposed at least partially in the third portion; and
including one or more axial stops connected to the shaft and friction material disposed at least partially between the shaft and a wall of the third portion.

16. The assembly of claim 15, wherein each axial stop of the one or more axial stops is axially spaced from the friction material and the friction material is radially spaced from the shaft.

* * * * *